COMPUTER CODE TABLES

| B7 | B6 | B5 | B4 | B3 | B2 | B1 | |
|---|---|---|---|---|---|---|---|
| 0 | 0 | 0 | 0 | 0 | 0 | 0 | BLANK |
| 1 | 0 | 0 | 0 | 0 | 0 | 1 | LINE FEED |
| 1 | 0 | 0 | 0 | 0 | 1 | 0 | SPACE |
| 0 | 0 | 0 | 0 | 0 | 1 | 1 | 0 |
| 1 | 0 | 0 | 0 | 1 | 0 | 0 | 1 |
| 0 | 0 | 0 | 0 | 1 | 0 | 1 | 2 |
| 0 | 0 | 0 | 0 | 1 | 1 | 0 | 3 |
| 1 | 0 | 0 | 0 | 1 | 1 | 1 | 4 |
| 1 | 0 | 0 | 1 | 0 | 0 | 0 | 5 |
| 0 | 0 | 0 | 1 | 0 | 0 | 1 | 6 |
| 0 | 0 | 0 | 1 | 0 | 1 | 0 | 7 |
| 1 | 0 | 0 | 1 | 0 | 1 | 1 | 8 |
| 0 | 0 | 0 | 1 | 1 | 0 | 0 | 9 |
| 1 | 0 | 0 | 1 | 1 | 1 | 0 | TAB |
| 0 | 0 | 1 | 0 | 0 | 1 | 0 | FILLER |
| 1 | 0 | 1 | 0 | 0 | 1 | 1 | FILLER ZERO |
| 0 | 0 | 1 | 0 | 1 | 0 | 0 | BACK SPACE |
| 1 | 0 | 1 | 0 | 1 | 0 | 1 | UPPER CASE |
| 0 | 0 | 1 | 0 | 1 | 1 | 0 | LOWER CASE |
| 0 | 0 | 1 | 1 | 0 | 0 | 0 | CARRIAGE RETURN |
| 1 | 0 | 1 | 1 | 0 | 0 | 1 | VOID |
| 1 | 0 | 1 | 1 | 1 | 1 | 1 | % |

| B7 | B6 | B5 | B4 | B3 | B2 | B1 | |
|---|---|---|---|---|---|---|---|
| 1 | 1 | 0 | 0 | 0 | 0 | 0 | • |
| 0 | 1 | 0 | 0 | 0 | 0 | 1 | A |
| 0 | 1 | 0 | 0 | 0 | 1 | 0 | B |
| 1 | 1 | 0 | 0 | 0 | 1 | 1 | C |
| 0 | 1 | 0 | 0 | 1 | 0 | 0 | D |
| 1 | 1 | 0 | 0 | 1 | 0 | 1 | E |
| 1 | 1 | 0 | 0 | 1 | 1 | 0 | F |
| 0 | 1 | 0 | 0 | 1 | 1 | 1 | G |
| 0 | 1 | 0 | 1 | 0 | 0 | 0 | H |
| 1 | 1 | 0 | 1 | 0 | 0 | 1 | I |
| 1 | 1 | 0 | 1 | 0 | 1 | 0 | J |
| 0 | 1 | 0 | 1 | 0 | 1 | 1 | K |
| 1 | 1 | 0 | 1 | 1 | 0 | 0 | L |
| 0 | 1 | 0 | 1 | 1 | 0 | 1 | M |
| 0 | 1 | 0 | 1 | 1 | 1 | 0 | * |
| 1 | 1 | 0 | 1 | 1 | 1 | 1 | $ |
| 0 | 1 | 1 | 0 | 0 | 0 | 0 | @ |
| 1 | 1 | 1 | 0 | 0 | 0 | 1 | N |
| 1 | 1 | 1 | 0 | 0 | 1 | 0 | O |
| 0 | 1 | 1 | 0 | 0 | 1 | 1 | P |
| 1 | 1 | 1 | 0 | 1 | 0 | 0 | Q |
| 0 | 1 | 1 | 0 | 1 | 0 | 1 | R |
| 0 | 1 | 1 | 0 | 1 | 1 | 0 | S |
| 1 | 1 | 1 | 0 | 1 | 1 | 1 | T |
| 1 | 1 | 1 | 1 | 0 | 0 | 0 | U |
| 0 | 1 | 1 | 1 | 0 | 0 | 1 | V |
| 0 | 1 | 1 | 1 | 0 | 1 | 0 | W |
| 1 | 1 | 1 | 1 | 0 | 1 | 1 | X |
| 0 | 1 | 1 | 1 | 1 | 0 | 0 | Y |
| 1 | 1 | 1 | 1 | 1 | 0 | 1 | Z |
| 1 | 1 | 1 | 1 | 1 | 1 | 0 | , |
| 1 | 1 | 1 | 1 | 1 | 1 | 1 | NULL |

INVENTORS
FRANK A. HILL
HOWARD L. STAHLE

BY

ATTORNEY

TRANSISTER BLOCK REGISTER -14-

June 25, 1963 F. A. HILL ET AL 3,095,553

INPUT BUFFER SYSTEM

Filed April 15, 1960 9 Sheets-Sheet 3

INPUT BUFFER SYSTEM

Filed April 15, 1960 9 Sheets-Sheet 5

HALF-WORD REGISTER 12A

June 25, 1963 F. A. HILL ET AL 3,095,553

INPUT BUFFER SYSTEM

Filed April 15, 1960 9 Sheets-Sheet 7

United States Patent Office 3,095,553

Patented June 25, 1963

3,095,553
INPUT BUFFER SYSTEM

Frank A. Hill, Van Nuys, and Howard L. Stahle, Montrose, Calif., assignors to General Precision, Inc., a corporation of Delaware Filed Apr. 15, 1960, Ser. No. 22,465
6 Claims. (Cl. 340—172.5)

The present invention relates to buffer systems, and it relates more particularly to an improved input buffer system for enabling input information from an input device, such as a paper tape reader, or the like, to be fed into an associated mechanism such as a digital computer.

Co-pending application S.N. 832,522 filed August 10, 1959 discloses and claims a digital computer which includes appropriate storage means for the information fed into the computer, and in which the storage means takes the form of a plurality of 8-word circulating registers. The computer described in the co-pending application is of the decimal type in which the information therein is in the form of a plurality of computer words, and in which each computer word is made up of twelve 7-bit characters. Each group of eight computer words in the computer forms a block of information, and each of the 8-word circulating registers referred to above is capable, therefore, of storing a block of information.

The computer disclosed in the co-pending application is described therein as including the input buffer for receiving information fed into the computer from an associated input device, and which is composed of a plurality of such 8-word circulating registers. Each of the 8-word circulating registers in the input buffer is controllable to serially receive a digital input from an appropriate input device, such as a usual paper tape reader, and subsequently to feed the received data into other portions of the computer.

As pointed out in the co-pending application, the number of 8-word circulating registers in the input buffer can conveniently be increased or decreased, depending upon the particular application of any constructed embodiment of the computer described in that application. As mentioned above, this is most advantageous in that the computer can be tailored to any particular need by the provision of an input buffer having a capacity appropriate to that need.

An object of the present invention is to provide an improved input buffer system incorporating registers, such as the 8-word circulating register described above, which permits data to be received from an appropriate input device and which achieves this in an improved and simplified manner and with a minimum of components and associated circuitry. The improved input buffer system of the invention is controllable to a first operating mode for receiving information from such an input device and for temporarily storing such information in serial circulating manner until required by the computer and with a timing controlled by the computer. The improved input buffer system of the invention is also controllable to a second operating mode for feeding the information stored therein to the computer.

Further objects and advantages of the invention will become apparent from a consideration of the following specification, when taken in conjunction with the accompaying drawings.

Figures 1, 2:
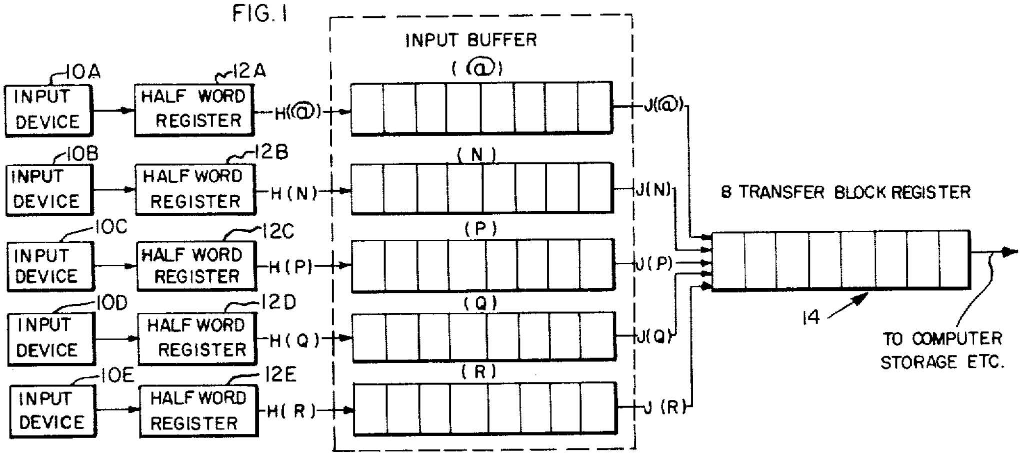
FIGURE 1 is a block diagram illustrating schematically an input buffer composed of a plurality of circulating registers and further illustrating the manner in which input devices may be coupled to that buffer in accordance with the present invention and the manner in which the buffer may be controlled to transfer its information to the computer by way of a transfer block register in the computer.
FIGURE 2 is a table showing a particular code which may be used in the computer or data processor associated with the input buffer of the invention.

As shown in block form in FIGURE 1, the input buffer may include a group of five 8-word circulating registers, designated @, N, P, Q and R. For a usual medium sized installation, however, seven or eight of these registers will be used. In general, the number of registers to be used will be dictated by the size of the installation. Each of the 8-word circulating registers is designated by a different address, and each address may be represented by a different multi-digit binary number in accordance with the coding illustrated in the code table of FIGURE 2. The registers of FIGURE 1, for example, are designated by the respective addresses @, N, P, Q and R.

The circulating registers @, N, P, Q and R of the input buffer in FIGURE 1 are each controlled in a manner to be described to have a "computer mode" whereby they are placed in an operating condition to feed information stored therein into the associated computer or data processor. The registers are also controllable in a manner to be described to have an "input mode" whereby they are placed in condition to receive information from respective ones of a plurality of associated input devices 10A, 10B, 10C, 10D and 10E. An H command, for example, accompanied by a selected one of the buffer addresses @, N, P, Q or R will cause the corresponding input device to feed its input information into the addressed one of the circulating registers in the input buffer.

In accordance with one aspect of the invention, and as will be presently described, a plurality of half-word circulating registers 12A, 12B, 12C, 12D and 12E are interposed between respective ones of the input devices 10A, 10B, 10C, 10D and 10E and the corresponding circulating registers @, N, P, Q and R of the input buffer. Each of the half-word registers is capable of storing six 7-bit characters. As each 7-bit character is read from any one of the input devices, its seven bits are fed serially into the corresponding half-word circulating register in a manner to be described. When six, or sometimes less, characters have been fed into the half-word register, then under the control of the system to be described, its contents are serially introduced to the corresponding one of the 8-word circulating registers @, N, P, Q, R in the input buffer.

When an 8-word block of data has been so fed to any one of the circulating registers @, N, P, Q, R of the input buffer from a corresponding one of the half-word registers so as to fill that register, the particular register then may be controlled to its "computer mode." Then, upon the occurrence of an instruction from the computer, constituted, for example, by a J command and an address corresponding to the particular register in the input buffer, the contents of that register are serially transferred to a circulating transfer block register 14. The information is then circulated in the transfer block register 14. The information is then circulated in the transfer block register 14 until a further instruction from the computer causes the information to be transferred to the computer memory or to other portions of the computer. When the information has been so transferred from any one of the circulating registers @, N, P, Q, R in the input buffer to the transfer block register 14, that circulating register can again be conditioned to its input mode to enable it to receive new information from the input device 10.

The manner in which an 8-word block of information may be transferred from an addressed circulating register in the input buffer to the transfer block register 14, and from the transfer block register to other portions of the computer, is fully described in the co-pending application referred to above. The logic circuitry associated with the transfer block 14 for accomplishing this purpose is shown in FIGURE 3 and will be discussed briefly in the present specification.

Figure 3:
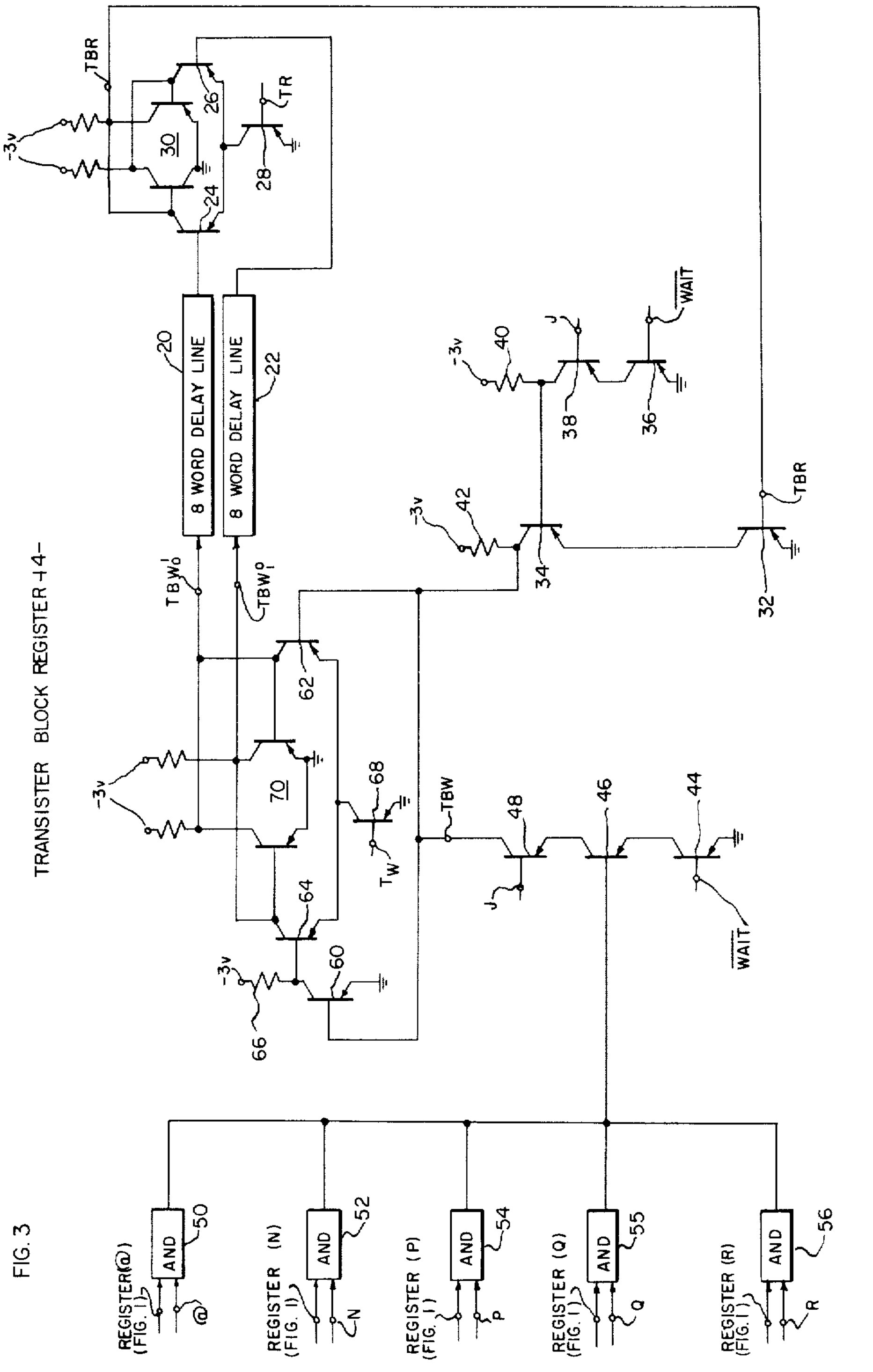
FIGURE 3 is a circuit diagram of the logic circuitry associated with the transfer block register of FIGURE 1 to enable that register to perform its storing and transfer functions.

The transfer block register 14 includes, as shown in FIGURE 3, a pair of 8-word delay lines 20 and 22. These 8-word delay lines, as fully described in the co-pending application Serial Number 832,522, may be of the acoustical type, or of any other known type. The output terminals of the delay lines 20 and 22 are connected respectively to the base of a transistor 24 and to the base of a transistor 26. The emitters of these transistors are both connected to the collector of a grounded emitter transistor 28.

A series of clock timing pulses ($T_R$) derived from the computer are applied to the base of the transistor 28. The collector of the transistor 24 is connected to the false input terminal of a read flip-flop 30, and the collector of the transistor 26 is connected to the true input terminal of that flip-flop. The read flip-flop 30 develops the term TBR at its true output terminal, and that term is applied to the base of a grounded emitter transistor 32. The collector of the transistor 32 is connected to the emitter of a transistor 34.

A term $\overline{\text{WAIT}}$ is applied to the base of a grounded emitter transistor 36, and the collector of that transistor is connected to the emitter of a transistor 38. The command term J is applied to the base of the transistor 38. The collector of the transistor 38 is connected to the base of the transistor 34 and to a resistor 40. The resistor 40 may have a resistance of 3900 ohms, for example, and it is connected to the negative terminal of the 3 volt direct voltage source. The collector of the transistor 34 is connected to an input terminal designated TBW and to a resistor 42. The resistor 42 may, for example, have a resistance of 3.9 kilo ohms, and it is connected to the negative terminal of the 3-volt direct voltage source. The term $\overline{\text{WAIT}}$ is also applied to the base of a grounded emitter transistor 44. The collector of the transistor 44 is connected to the emitter of a transistor 46, and the collector of the transistor 46 is connected to the emitter of a transistor 48. The collector of the transistor 48 is connected to the input terminal TBW. The command term J from the computer is applied to the base of the transistor 48.

A plurality of "and" gates 50, 52, 54, 55 and 56 have respective input terminals connected to different ones of the circulating registers @, N, P, Q, R in the input buffer of FIGURE 1. These "and" gates also each have a second input terminal which receives a signal when its corresponding circulating register is addressed by the computer. The result is that one of the "and" gates 50, 52, 54, 55 and 56 is activated when a particular circulating register in the input buffer is addressed, and the activated "and" gate passes the contents of that register to the base of the transistor 46.

The "and" gates are well known to the electronic digital computer art. These "and" gates may be composed of transistor circuitry of the type shown in FIGURE 3. An "and" gate is enabled only when all its input terms are in a true state.

The input terminal TBW is connected to the base of a grounded emitter transistor 60 and to the base of a transistor 62. The collector of the transistor 60 is connected to the base of a transistor 64 and to a resistor 66. The resistor 66 may have a resistance of 2.4 kilo ohms, for example, and it is connected to the negative terminal of the 3 volt direct voltage source. The emitters of the transistors 62 and 64 are connected to the collector of a transistor 68. The emitter of the transistor 68 is grounded, and a series of "write" clock timing pulses $T_W$ from the computer are introduced to the base of that transistor.

The collector of the transistor 64 is connected to the false input terminal of a write flip-flop 70, and the collector of the transistor 62 is connected to the true input terminal of that flip-flop. The false output terminal of the write flip-flop 70 develops a term $TBW_0^1$, and that term is introduced to the input terminal of the delay line 20. The true output terminal of the write flip-flop 70 develops the term $TBW_1^0$, and the latter term is introduced to the delay line 22.

The circuitry and operation of the transfer block register of FIGURE 3 is described in detail in the co-pending application 832,522, referred to above, and the operation will be described only briefly herein. For the circulation mode of operation of the transfer block register 14 during which the 8-word block of information is stored and circulated in the register, a circulating path is completed from the read flip-flop 30 back to the write flip-flop 70. This circulating path extends, for example, from the true output terminal TBR of the read flip-flop 30 and through the transistors 32 and 34 back to the input terminal TBW of the write flip-flop 70.

In the presence of a J command from the computer, however, and when the term $\overline{\text{WAIT}}$ is true, the circulating path is broken. The term $\overline{\text{WAIT}}$ is true whenever the computer has terminated the execution of a previous instruction, and when it is ready to execute the next instruction.

When the circulating path is broken, in the manner described above, an input path to the transfer block register 14 is immediately established through the transistors 44, 46 and 48 to the input terminal TBW. This path passes the contents of the selected circulating register @, N, P, Q or R in the input buffer to the input terminals of the delay lines 20 and 22. It will be appreciated that this operation is effected by the presence of a J command from the computer together with an address term designating the selected one of the circulating registers @, N, P, Q, R in the input buffer.

As soon as the contents of the selected register in the input buffer has been read into the transfer block register 14, the command term J goes false, and the circulating path in the transfer block register is again established. This enables the new contents to be circulated in the transfer block register for subsequent transfer to other portions of the computer.

Figure 4:
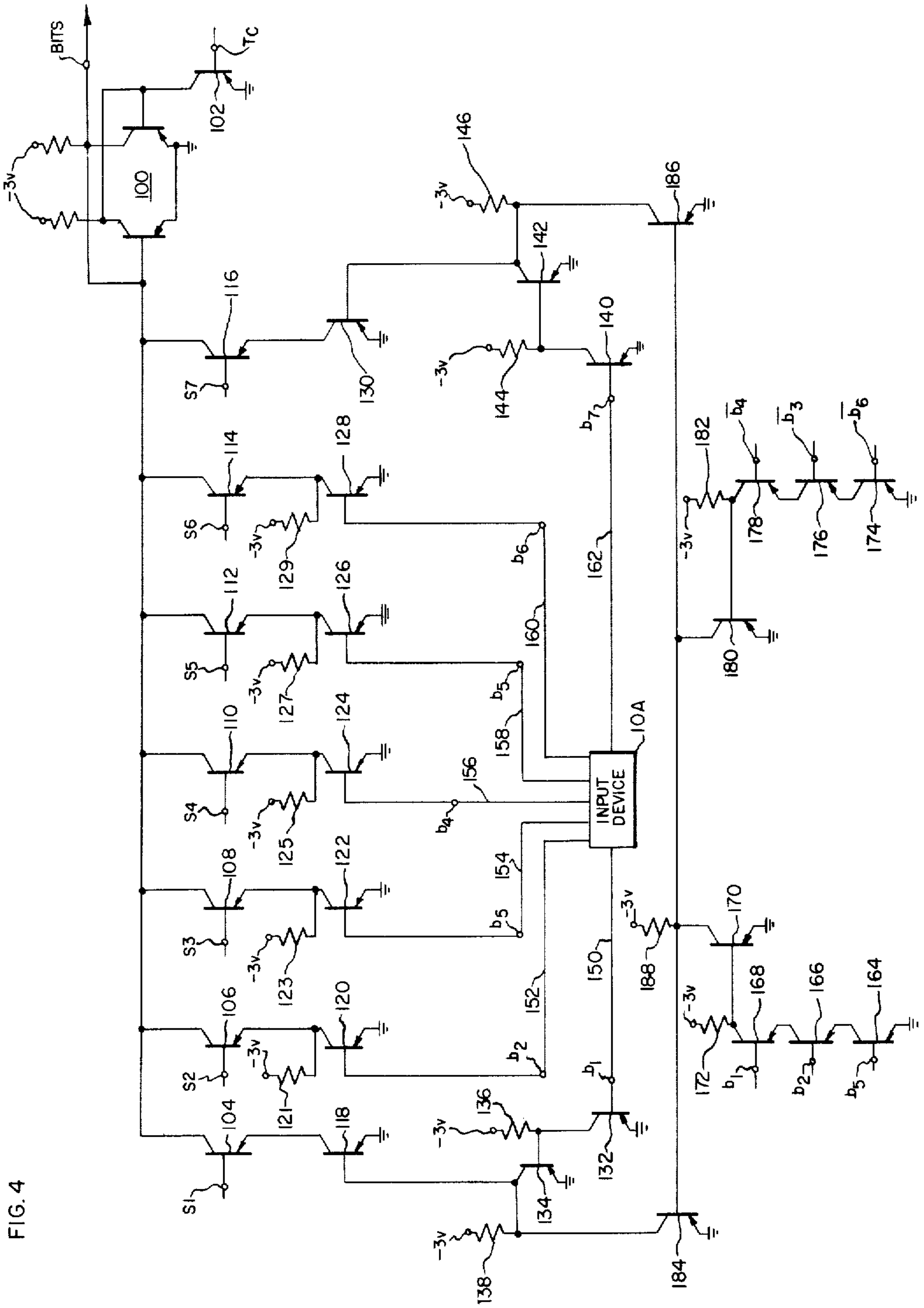
FIGURE 4 is a circuit diagram of appropriate logic circuitry associated with one of the input devices of FIGURE 1 to enable that input device serially to introduce its information into the input buffer.

The circuitry associated with the input device 10A of FIGURE 1 is shown in FIGURE 4. It will be understood that similar circuitry may be associated with the other input devices 10B, 10C, 10D and 10E. The circuitry of FIGURE 4 includes a flip-flop 100, and this flip-flop develops the term BITS at its true output terminal. A grounded emitter transistor 102 has its collector connected to the false input terminal of the flip-flop 100. A series of clock timing pulses $T_C$ from the computer are introduced to the base of the transistor 102.

A plurality of transistors 104, 106, 108, 110, 112, 114 and 116 all have their collectors connected to the true input terminal of the flip-flop 100. A series of bit timing signals S1, S2, S3, S4, S5, S6 and S7 from the computer are respectively introduced to the bases of these transistors. A plurality of grounded emitter transistors 118, 120, 122, 124, 126, 128 and 130 have their collector electrodes respectively connected to emitters of the transistors of the first plurality. The collectors of the transistors 120, 122, 124, 126 and 128 are also respectively connected to a corresponding plurality of 3.9 kilo-ohm resistors 121, 123, 125, 127 and 129. These resistors are all connected to the negative terminal of the 3-volt direct voltage source.

A grounded emitter transistor 132 has its collector connected to the base of a grounded emitter transistor 134 and to a 3.9 kilo-ohm resistor 136. The resistor 136 is connected to the negative terminal of the 3-volt direct voltage source. The collector of the transistor 134 is connected to the base of the transistor 118 and to a resistor 138. The resistor 138 may have a resistance of 3.9 kilo-ohms, and it is connected to the negative terminal of the 3-volt direct voltage source.

A grounded emitter transistor 140 has its collector connected to the base of a grounded emitter transistor 142 and to a resistor 144. The resistor 144 may have a resistance of 3.9 kilo-ohms, and it is connected to the negative terminal of the 3-volt direct voltage source. The collector of the transistor 142 is connected to a 3.9 kilo-ohm resistor 146 and to the base of the transistor 130. The resistor 146 is connected to the negative terminal of the 3-volt direct voltage source.

The input device 10A is connected to the base electrodes of the transistors 132, 120, 122, 124, 126, 128 and 140 by seven leads 150, 152, 154, 156, 158, 160 and 162; the leads extending to respective ones of the base electrodes. The input device 10 supplies the input terms $b_1$, $b_2$, $b_3$, $b_4$, $b_5$, $b_6$ and $b_7$ to the bases of respective ones of the transistors 132, 120, 122, 124, 126, 128 and 140.

A grounded emitter transistor 164 has its collector connected to the emitter of a transistor 166. The collector of the latter transistor is connected to the emitter of a transistor 168, and the collector of the transistor 168 is connected to the base of a grounded emitter transistor 170 and to a resistor 172. The resistor 172 may have a resistance of 4.7 kilo-ohms, and it is connected to a negative terminal of the 3-volt direct voltage source. The terms $b_1$, $b_2$ and $b_5$ from the input device 10A are respectively applied to the bases of the transistors 168, 166 and 164.

A grounded emitter transistor 174 has its collector connected to the emitter of a transistor 176, and the collector of the transistor 176 is connected to the emitter of a transistor 178. The collector of the latter transistor is connected to the base of a grounded emitter transistor 180 and to a resistor 182. The resistor 182 may have a resistance of 4.7 kilo-ohms, and it is connected to the negative terminal of the 3-volt direct voltage source. The terms $\bar{b}_4$, $\bar{b}_3$, $\bar{b}_6$ from the input device 10 are applied to the base electrodes of the transistors 178, 176 and 174, respectively.

The collector of the transistor 178 and the collector of the transistor 180 are connected to the base of a grounded emitter transistor 184, to the base of a grounded-emitter transistor 186 and to a resistor 188. The resistor 188 may have a resistance of 3.9 kilo-ohms and it is connected to the negative terminal of the 3-volt direct voltage source. The collector of the transistor 184 is connected to the base of the transistor 118, and the collector of the transistor 186 is connected to the base of the transistor 130.

The input device 10A may be punched paper tape reader, for example. There are presently two general types of paper tape readers in common use. One of these is a mechanical type in which wire brushes are caused to selectively establish electrical contact under the control of the punched paper tape. The second of these is a photo-electric type in which light beams are caused to selectively establish electrical connections under the control of the punched paper tape.

In the paper tape reader under consideration, each position of the punched paper tape corresponds to a different 7-bit character of the information to be introduced to the computer and a hole in the tape at any particular bit location at each such position represents a unity bit, while the absence of a hole at a bit location represents a zero bit. The presence of a hole causes a corresponding one of the above described electrical connections to be established.

Therefore, as the punched paper tape is moved from position to position in the paper tape reader input device 10A, the reader successively provides over the seven independent leads 150, 152, 154, 156, 158, 160 and 162, groups of seven binary signal indications which are representative of the characters recorded at the success positions on the tape. These seven leads are connected respectively to the transistors 132, 120, 122, 124, 126, 128 and 140, as described above; and they supply the terms $b_1$–$b_7$ for each position of the tape to respective ones of these transistors. These terms are true or false in correspondence with the presence or absence of a hole in the corresponding bit location for each position of the tape.

The speed of movement of the paper tape is sufficiently slow with respect to the repetition frequency of the computer bit timing signals S1–S7, so as to enable the seven terms $b_1$–$b_7$ to be successively scanned by the bit timing signals S1–S7 in the circuitry of FIGURE 4. That is, each time a particular position of the tape is in the reading station of the input device 10A to cause the terms $b_1$–$b_7$ to assume a particular pattern of 1 or 0 values corresponding to the hole pattern in the tape at that position, the tape may be scanned so that each term $b_1$–$b_7$ is successively sensed and serially fed to the flip-flop 100. This results in a serial triggering of the flip-flop 100 in accordance with the bits of each character recorded on the tape at the successive tape positions. The flip-flop 100 develops the output term BITS, and that term takes the form of a serial presentation of seven binary bits corresponding to each of the successive characters recorded on the tape as each position on the tape is scanned.

In a manner to be described, the term "filler zero" 1010011 (LSD on right) is used in the half-word register 12 of FIGURE 1 to represent each of the 7-bit character positions in that register which are as yet unfilled. Then, whenever a character is written into the half-word register, it replaces the filler zero originally in its corresponding character position. This creates a problem when a filler zero character is recorded on the punched paper tape and read by the input device 10A. Without further provisions, such a character would have no effect on the half-word register, since it would merely replace the original filler zero character in the half-word register. This would cause the half-word register, in effect, to ignore the filler zero input, and would cause the character position occupied by that filler zero character to be replaced and occupied by the next character read into the half-word register. This would not only cause the filler zero term on the tape to be ignored but would also cause a change in the character position in the computer of the subsequent characters read into the computer, as compared with the character positions on the paper tape. This would create problems for the programmer in preventing confusion and printing distortions.

The circuitry of the present invention prevents any such shifting in character positions when filler zero characters are read off the punched paper tape by the input device 10A and read into the half-word register 12. This is achieved in the circuitry of FIGURE 4 in the following manner. The circuitry of FIGURE 4 serves to convert each "filler zero" character (1010011) into a "filler" character 0010010 (LSD on right). The filler character is accepted by the half-word register, and it retains the character position of the original filler zero character as it is passed through the computer.

The conversion described above is accomplished by the circuitry of the transistors 164, 166 and 168, which converts the $b_1$ bit of the filler zero character from 1 to 0; and by the circuitry of the transistors 174, 176 and 178 which convert the $b_7$ bit of the filler zero character from 1 to 0. Therefore, any time a "filler zero" character is read from the paper tape into the circuitry of FIGURE 4, a "filler" character is automatically read into the half-word register 12 through the flip-flop 100, so as to preserve the original position of the characters as they are fed into the computer.

The term "BITS" from the flip-flop 100 in FIGURE 4 is applied to the half-word register 12 of FIGURE 1 in a manner to be described. This term is read into the half-word register each time a character read by the input device 10 from the punched tape is to be inserted into a designated character position in the half-word register. Before this can be carried out, however, certain conditions must be met. Some of these conditions involve the terms formed by the circuitry of FIGURES 5–10, now to be described.

Figure 5:
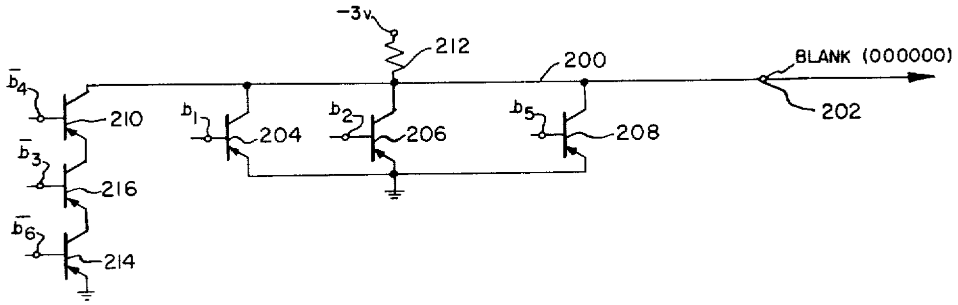
FIGURES 5, 6 and 7 are logic circuits for forming certain functional terms in response to characters read from an input device.

The circuitry of FIGURE 5 forms the term "BLANK" which is represented by seven zeroes, as shown by the table of FIGURE 2. The circuitry of FIGURE 5 includes a common lead 200 which is connected to an output terminal 202 at which the term "BLANK" is produced. The common lead 200 is also connected to the collectors of a group of grounded emitter transistors 204, 206 and 208. The terms $b_1$, $b_2$ and $b_5$ are introduced to the base electrodes of respective ones of these transistors. A transistor 210 has its collector connected to the common lead 200 and to a resistor 212. The resistor 212 may have a resistance of 3.9 kilo-ohms, and it is connected to the negative terminal of the 3-volt direct voltage source. A grounded emitter transistor 214 has its collector connected to the emitter of a transistor 216, and the collector of the latter transistor is connected to the emitter of a transistor 210. The term $\overline{b_4}$ is applied to the base of the transistor 210, the term $\overline{b_3}$ is applied to the base of the transistor 216, the term $\overline{b_6}$ is applied to the base of the transistor 214.

Figure 6:
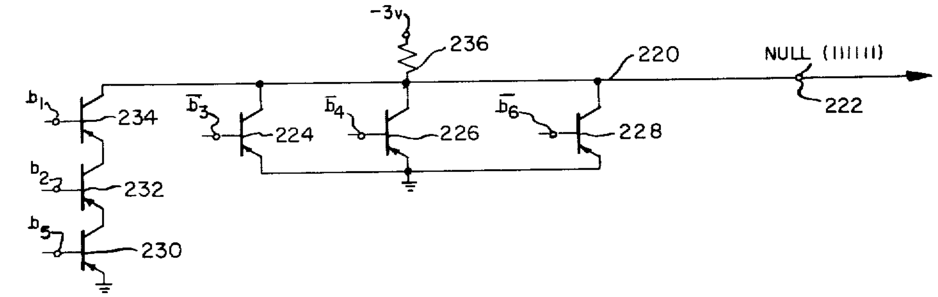

The circuitry of FIGURE 6 forms the term "NULL" which is represented by six ones, as shown by the table of FIGURE 2. The circuitry of FIGURE 6 includes a common lead 220 which is connected to an output terminal 222 at which the output term "NULL" is formed. The lead 220 is connected to the collectors of a plurality of transistors 222, 226 and 228. These transistors have grounded emitters. The terms $\overline{b_3}$, $\overline{b_4}$ and $\overline{b_6}$ are applied to respective ones of the base electrodes of the transistors 224, 226 and 228. The term $b_5$ is applied to the base of a grounded-emitter transistor 230. The collector of that transistor is connected to the emitter of a transistor 232, and the collector of the latter transistor is connected to the emitter of the transistor 234. The term $b_1$ is applied to the base of the transistor 234, and the term $b_2$ is applied to the base of the transistor 232. The collector of the transistor 234 is connected to the lead 220 and to a resistor 236. The resistor 236 may have a resistance of 3.9 kilo-ohms, and it is connected to the negative terminal of the 3 volt direct voltage source.

It is desired for operating and programming convenience that neither the blank or null characters on the punched paper tape be entered into the computer. It is for that reason that the circuitry of FIGURE 5 forms the term "BLANK" and the circuitry of FIGURE 6 forms the term "NULL." The terms BLANK and NULL formed by the circuitry of FIGURES 5 and 6 serve to block the entry to the half-word register 12 of such characters whenever the characters are read from the paper tape by the input device 10A of FIGURE 4. In accordance with an arbitrary code, the term NULL is recorded on the paper tape only if there is a mistake, and the term BLANK is sensed from the tape by the reader in the input device 10 at any time there are no holes in any of the brush positions. This latter condition occurs, for example, between messages on the tape, before messages and after messages.

In accordance with the arbitrary code mentioned above the term "TAB" (1011100–LSD at right) is recorded on the punched paper tape to indicate the end of a field of characters of, for example, six characters or less. This term is used to cause the contents of the half-word (6 character) register 12 to be introduced to an addressed one of the 8 word registers @, N, P, Q, R of the input buffer of FIGURE 1, in a manner to be described. In like manner, the carriage return term "CR" (0011000–LSD at right) is recorded on the input punched paper tape to cause the computer to change the mode of operation of the input buffer of FIGURE 1 from "input" to "computer" and to stop the movement of the paper tape. The term "VOID" (1011010–LSD at right) is recorded on the input punched paper tape to cause the computer to replace the contents of the half-word register 12A with filler zeroes. This, in effect, voids the previous contents of the half-word register and conditions the register to receive the the next field of characters applied to it from the input device 10A. The entry of the function terms TAB, CR and VOID into the computer must be prevented, and this is achieved in a manner to be described. These terms are formed by the circuitry of FIGURE 7, and the outputs from this circuitry are used in a manner to be described to perform the intended functions of these terms and to block the entry of the terms from the paper tape into the half-word register 12A of FIGURE 1.

Figure 7:
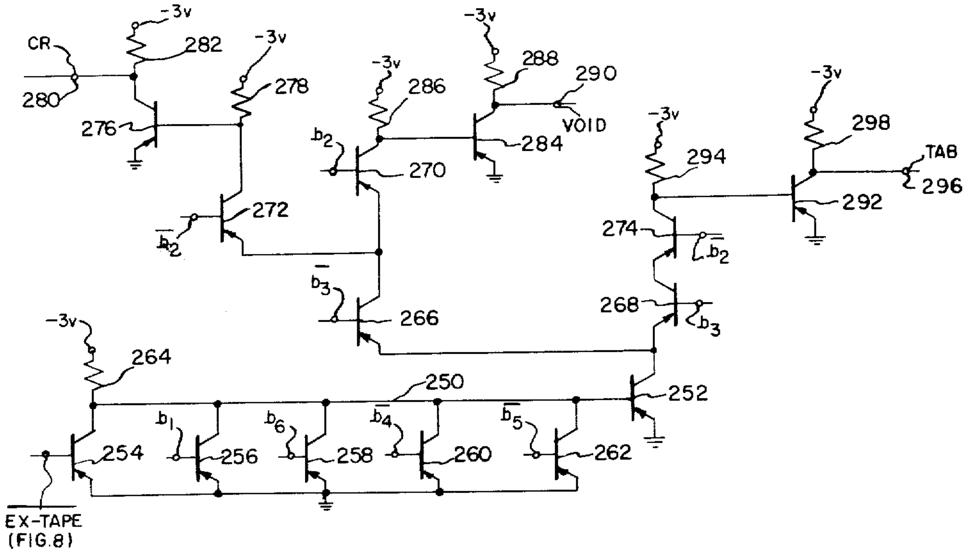

The circuitry of FIGURE 7 includes a common lead 250 which is connected to the base of a grounded emitter transistor 252. The lead 250 is connected to the collectors of a plurality of grounded emitter transistors 254, 256, 258, 260 and 262. The lead 250 is also connected to a resistor 264, which, in turn, is connected to the negative terminal of the 3-volt direct voltage source. The resistor 264 may have a resistance of 3.9 kilo-ohms. The terms $b_1$, $b_6$, $\overline{b_4}$ and $\overline{b_5}$ are introduced to respective ones of the base electrodes of the transistors 256, 258, 260 and 262. A term $\overline{\text{EX TAPE}}$ is applied to the base of the transistor 254. This latter term is derived from the circuitry of FIGURE 8, as will be described.

The collector of the transistor 252 is connected to the emitter of a transistor 266 and to the emitter of a transistor 268. The collector of the transistor 266 is connected to the emitter of a transistor 270 and to the emitter of a transistor 272. The collector of the transistor 268 is connected to the emitter of a transistor 274. The term $b_3$ is applied to the base of the transistor 266, the term $b_2$ is applied to the base of the transistor 270, the term $\overline{b_2}$ is applied to the base of the transistor 272, and the latter term is also applied to the base of the transistor 274.

The collector of the transistor 272 is connected to the base of a grounded emitter transistor 276 and to a resistor 278. The resistor 278 may have a resistance of 4.7 kilo-ohms, and that resistor is connected to the negative terminal of the 3-volt direct voltage source. The collector of the transistor 276 is connected to an output terminal 280 and to a resistor 282. The resistor 282 may have a resistance of 2.2 kilo-ohms, and it is connected to the negative terminal of the 3-volt direct voltage source. The term CR is produced at the output terminal 280.

The collector of the transistor 270 is connected to the base of a grounded emitter transistor 284 and to a resistor 286. The resistor 286 may have a resistance of 4.7 kilo-ohms, and it is connected to the negative terminal of the 3-volt direct voltage source. The collector of the transistor 284 is connected to a resistor 288 and to an output terminal 290. The resistor 288 may have a resistance of 2.2 kilo-ohms, and it is connected to the negative terminal of the 3-volt direct voltage source.

The collector of the transistor 274 is connected to the base of a grounded emitter transistor 292 and to a resistor 294. The resistor 294 has a resistance of 4.7 kilo-ohms, and it is connected to the negative terminal of the 3-volt direct voltage source. The collector of the transistor 292 is connected to an output terminal 296 and to a resistor 298. The resistor 298 may have a resistance of 2.2 kilo-ohms, and it is connected to the negative terminal of the 3-volt direct voltage source. The term TAB is produced at the output terminal 296.

The term EX TAPE must be true before any information can be fed into the half-word register 12. This term is formed by the circuitry of FIGURES 8 and 9. The circuitry of FIGURE 8 includes a flip-flop 300, and the circuitry of FIGURE 9 includes a flip-flop 302. A grounded-emitter transistor 304 has its collector connected to the false input terminal of the flip-flop 300, and a transistor 306 has its collector connected to the true input terminal of that flip-flop. The flip-flop 300 develops the term "EX TAPE" at its true output terminal, and it develops the term "$\overline{\text{EX TAPE}}$" at its false output terminal. The timing signal $C_7'$ from the computer is applied to the base of the transistor 304.

A grounded emitter transistor 310 has its collector connected to the emitter of the transistor 306. A timing signal $C_7'$ from the computer is applied to the base of the transistor 310. A group of three ground emitter transistors 312, 314, and 316 have their collectors connected to the base of the transistor 306 and to a resistor 318. The resistor 318 may have a resistance of 4.7 kilo-ohms, and it is connected to the negative terminal of the 3-volt direct voltage source.

Figure 9:
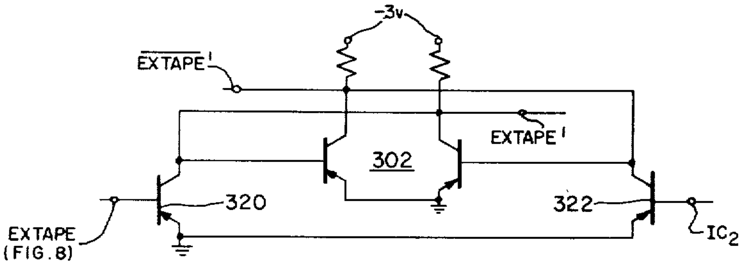
FIGURE 9 is a flip-flop circuit which is used to control the circuitry of FIGURE 8.

A term $\overline{IC_1}$ derived from the input device 10A is applied to the base of the transistor 312, a term $\overline{\text{READ}}$ is applied to the base of the transistor 314, and a term $\overline{\text{EX TAPE}}'$ derived from the false output terminal of the flip-flop 302 of FIGURE 9 is applied to the base of the transistor 316.

The term EX TAPE from the the true output terminal of the flip-flop 300 is applied to the base of a transistor 320 in FIGURE 9. This transistor has its emitter connected to ground, and it has its collector connected to the false input terminal of the flip-flop 302. A term $IC_2$ derived from the input device 10A is supplied to the base of a grounded emitter transistor 322, and the collector of that transistor is connected to the true input terminal of the flip-flop 302.

A cam-actuated switch in the input device 10A produces the term $IC_1$ each time it is closed, and it produces the term $\overline{IC_1}$ whenever it is open. This cam-actuated switch is closed each time the punched paper tape moves to a position in the input device 10A at which its next character can be read by the reader in the input device. At that time, all the brushes of the input device are in position to make selective electrical contact through the holes in the tape corresponding to the unity bits of the character at that position of the tape and thereby "READ" the character recorded at that particular position.

When the cam-actuated switch mentioned above, or its equivalent in other types of input devices, closes to make the term $IC_1$ true, an indication is provided, therefore, that the tape is in position to have a character read from it by the reader in the input device 10. Just prior to that time, a second cam switch in the input device closes to make the term $IC_2$ true. This latter term becomes true as the punched paper tape is being moved from one character position to the next, and is between two character positions. The term $IC_1$ on the other hand, becomes true each time the tape actually reaches a subsequent character position.

Figure 8:
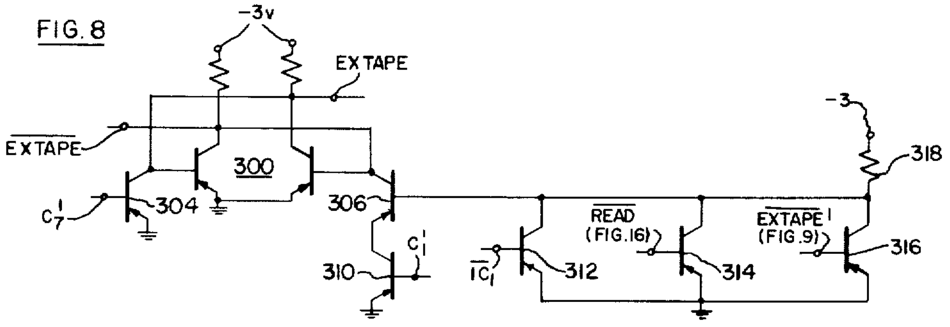
FIGURE 8 is a control circuit which responds to certain conditions to form a term which permits the input circuitry of the system to receive the character being read from the input device at any particular time.

When the term $IC_2$ becomes true, it triggers the flip-flop 302 in FIGURE 9 true to make the term $\overline{\text{EX TAPE}}'$ false. Then, when the first cam switch in the input device 10A closes to make the term $\overline{IC_1}$ false, the flip-flop 300 in FIGURE 8 is then set true at the following $C_1'$ time assuming that the system is in its "read" condition (as will be described) so that the term $\overline{\text{READ}}$ is false. Therefore, after the above conditions have been satisfied, the flip-flop 300 is set true by the term $C_1'$ at the beginning of the next block time. The flip-flop 300 now remains true until it is subsequently set false by the term $C_7'$ at the end of the sixth character time in the first word of the next block. Therefore, the term EX TAPE is true for the first six character times of the next block.

As soon as the term EX TAPE becomes true, the flip-flop 302 of FIGURE 9 is returned to its false state. This prevents any double triggering of the flip-flop 300 in FIGURE 8 for any one character on the tape. This is so, because the flip-flop 302 cannot again be set true until the tape is moved to its next character position so as to set the term $IC_2$ true once again.

Figure 10:
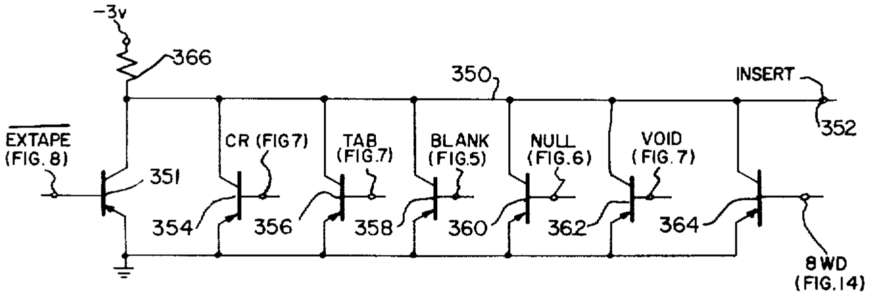
FIGURE 10 is a logic circuit which responds to different input terms for forming a term which controls the feed information into the buffer system of the invention.

The circuitry of FIGURE 10 is used to form the term "INSERT." This term must be true before the "BITS" from the flip-flop 100 of FIGURE 4 can be inserted into the half-word register 12. The circuitry of FIGURE 10 includes a common lead 350 which is connected to an output terminal 352 at which the term "INSERT" is produced. This common lead 350 is connected to the collectors of a plurality of grounded-emitter transistors 352, 354, 356, 358, 360, 362 and 364. The common lead 350 is also connected to a resistor 366. The resistor 366 may have a resistance of 2.2 kilo-ohms, and it is connected to the negative terminal of the 3-volt direct voltage source. The term $\overline{\text{EX TAPE}}$ of FIGURE 8 is applied to the base of the transistor 352, the term CR of FIGURE 7 is applied to the base of the transistor 354, the term TAB of FIGURE 7 is applied to the base of the transistor 356, the term "BLANK" of FIGURE 5 is applied to the base of the transistor 358, the term NULL of FIGURE 6 is applied to the base of the transistor 360, and the term VOID in FIGURE 7 is applied to the base of the transistor 362.

Figure 14:
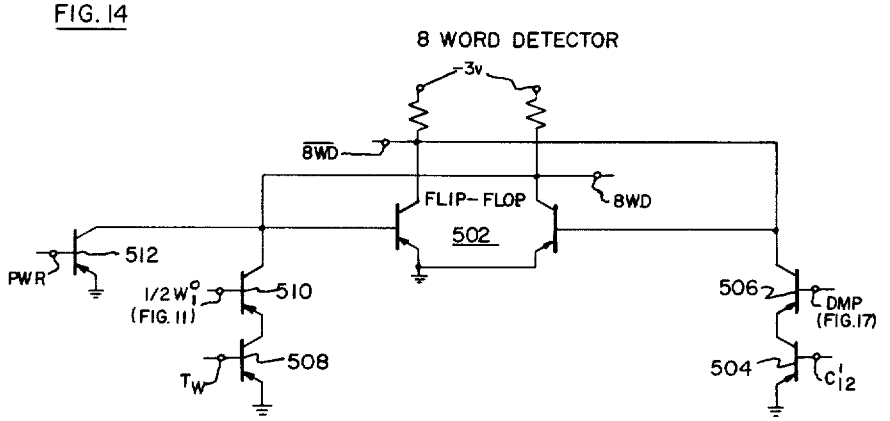
FIGURE 14 is a diagram of a detector which is used to sense when the 8-word register of FIGURE 13 has been filled with information.

A term 8WD derived from the circuitry of FIGURE 14 is applied to the base of the transistor 364. This term is true only if the selected 8-word delay line @, N, P, Q, R in the input buffer is full. The arrangement is such that the selected 8-word delay line in the input buffer will accept no further information when it is full. This enables the programmer to enter notes and other extraneous information on the tape at the completion of an 8-word block, and the input system automatically rejects the entry of such information into the computer.

The circuitry of FIGURE 10 forms the term "INSERT" only when all the terms introduced to the transistors 352, 354, 356, 358, 360, 362 and 364 are false. This causes, as mentioned above, the input BITS to be introduced to the half-word register 12A only when none of these terms is true. This means that the tape must be in position in the input device 10A such that a character may be read; and the character so read must not be of the functional type CR, TAB, BLANK, NULL or VOID. Then, if the addressed 8-word register in the input buffer is not already filled with information, the character read by the input device 10A may be introduced to the corresponding half-word register 12A.

Figure 11:
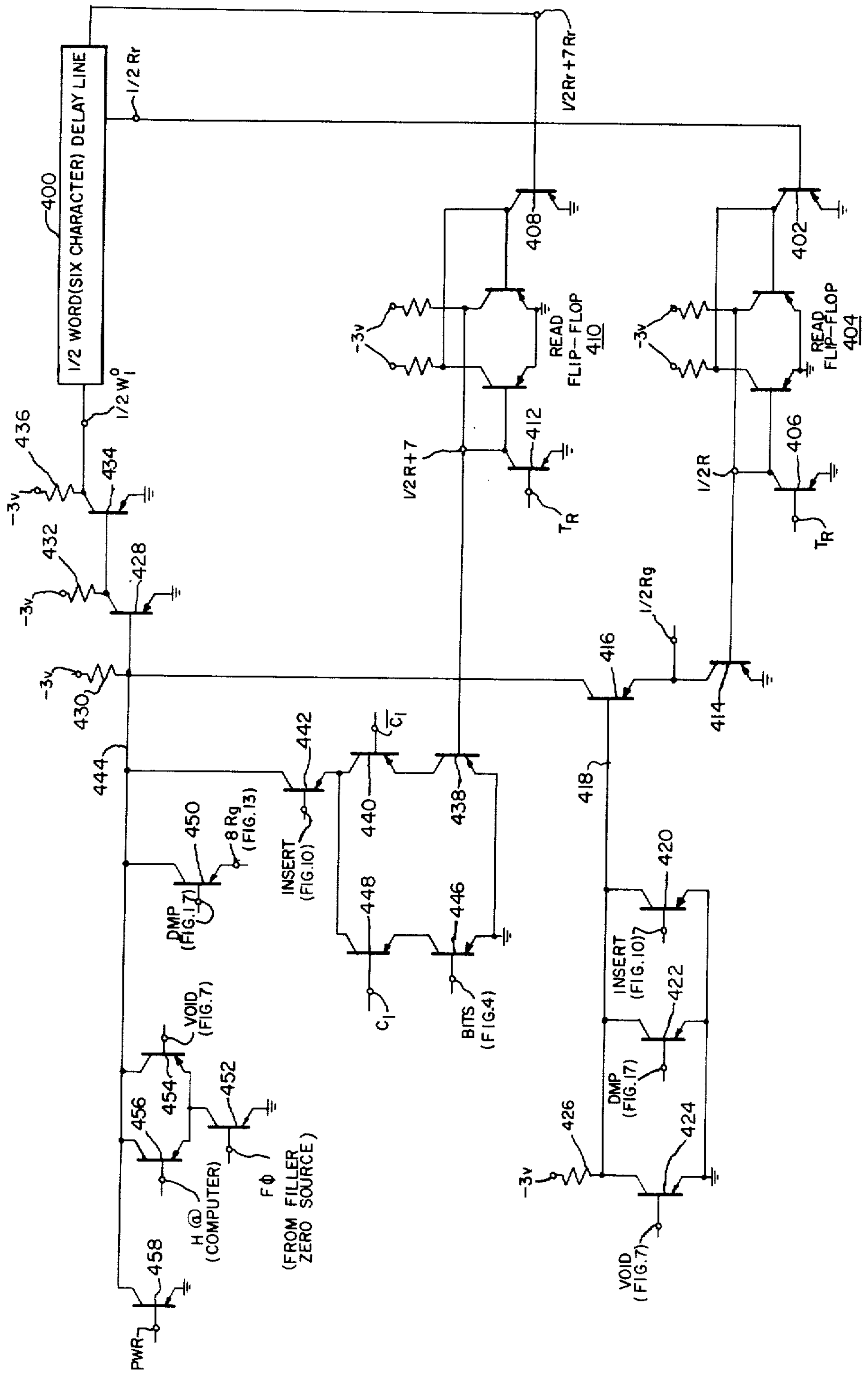
FIGURE 11 is a detailed representation of the circuitry and elements associated with a half-word register which is used in the buffer system of the invention.

The circuitry associated with the half-word register 12A is shown in FIGURE 11. It will be understood that similar circuitry may be associated with the half-word registers 12B–12E.

The half-word register 12A of FIGURE 11 includes a delay line 400 which is capable of holding six decimal or alphabetic characters which, in the system under discussion, constitutes half a data word. The delay line 400 is constructed to have a first output terminal designated $\frac{1}{2}R_r$. This terminal is displaced from the input terminal of the delay line by six decimal characters. The delay line 400 also has a second output terminal $\frac{1}{2}R_r+7R_r$, this second output terminal exhibiting an additional decimal character delay.

The output terminal $\frac{1}{2}R_r$ is connected to the base of a transistor 402. The emitter of the transistor 402 is grounded, and the collector of that transistor is connected to the true input terminal of a read flip-flop 404. The clock timing pulses $T_R$ from the computer are introduced to the base of a transistor 406. The emitter of the transistor 406 is grounded, and the collector of that transistor is connected to the false input terminal of the read flip-flop 404.

The output terminal $\frac{1}{2}R_r+7R_r$ of the delay line 400 is connected to the base of a transistor 408. The emitter of the latter transistor is grounded and its collector is connected to the true input terminal of a read flip-flop 410. The clock pulses $T_R$ from the computer are applied to the base of a grounded emitter transistor 412. The collector of the latter transistor is connected to the false input terminal of the flip-flop 410. The true output terminal of the read flip-flop 404 develops the term $\frac{1}{2}R$, and this term is introduced to the base of a transistor 414. The emitter of the transistor 414 is grounded, and the collector of that transistor is connected to the emitter of a transistor 416 and to an output terminal designated $\frac{1}{2}Rg$.

A common lead 418 is connected to the base of the transistor 414, and a plurality of transistors 420, 422 and 424 have their collectors connected to that lead. The emitters of the transistors 420, 422 and 424 are all grounded. The term INSERT, derived from the circuitry of FIGURE 10, is introduced to the base of the transistor 420. The term DMP derived from the circuitry of FIGURE 17, as will be described, is applied to the base of the transistor 422. The term VOID derived from the circuitry of FIGURE 7 is applied to the base of the transistor 424. The common lead 418 is connected to a resistor 426 which may have a resistance of 3.9 kilo ohms, for example, and which is connected to the negative terminal of the 3-volt direct voltage source.

The collector of the transistor 416 is connected to the base of a grounded emitter transistor 428 and to a resistor 430. The resistor 430 may have a resistance of 3.9 kilo ohms, and it is connected to the negative terminal of the 3-volt direct voltage source. The emitter of the transistor 428 is grounded, and the collector of that transistor is connected to a resistor 432, and to the base of a grounded emitter transistor 434. The resistor 432 may have a resistance of 2.2 kilo ohms, and it is connected to the negative terminal of the 3-volt direct voltage source. The collector of the transistor 434 is connected to a resistor 436 and to the input terminal of the delay line 400. The transistor 434 introduces the term $\frac{1}{2}W_1^0$ to that delay line. The resistor 436 may have a resistance of 2.2 kilo ohms, and it is connected to the negative terminal of the 3-volt direct voltage source.

The read flip-flop 410 develops the term $\frac{1}{2}R+7$ at its true output terminal, and that term is introduced to the base of a grounded emitter transistor 438. The transistor 438 has its collector connected to the emitter of a transistor 440. The character timing term $\overline{C1}$ from the computer is introduced to the base of the transistor 440, and the collector of that transistor is connected to the emitter of a transistor 442. The collector of the transistor 442 is connected to a common lead 444, and the common lead connects with the base of the transistor 428.

The term BITS of FIGURE 4 is introduced to the base of a grounded emitter transistor 446. The collector of that transistor is connected to the emitter of a transistor 448. The character timing signal C1 from the computer is applied to the base of the transistor 448, and the collector of that transistor is connected to the emitter of the transistor 442.

Figure 17:
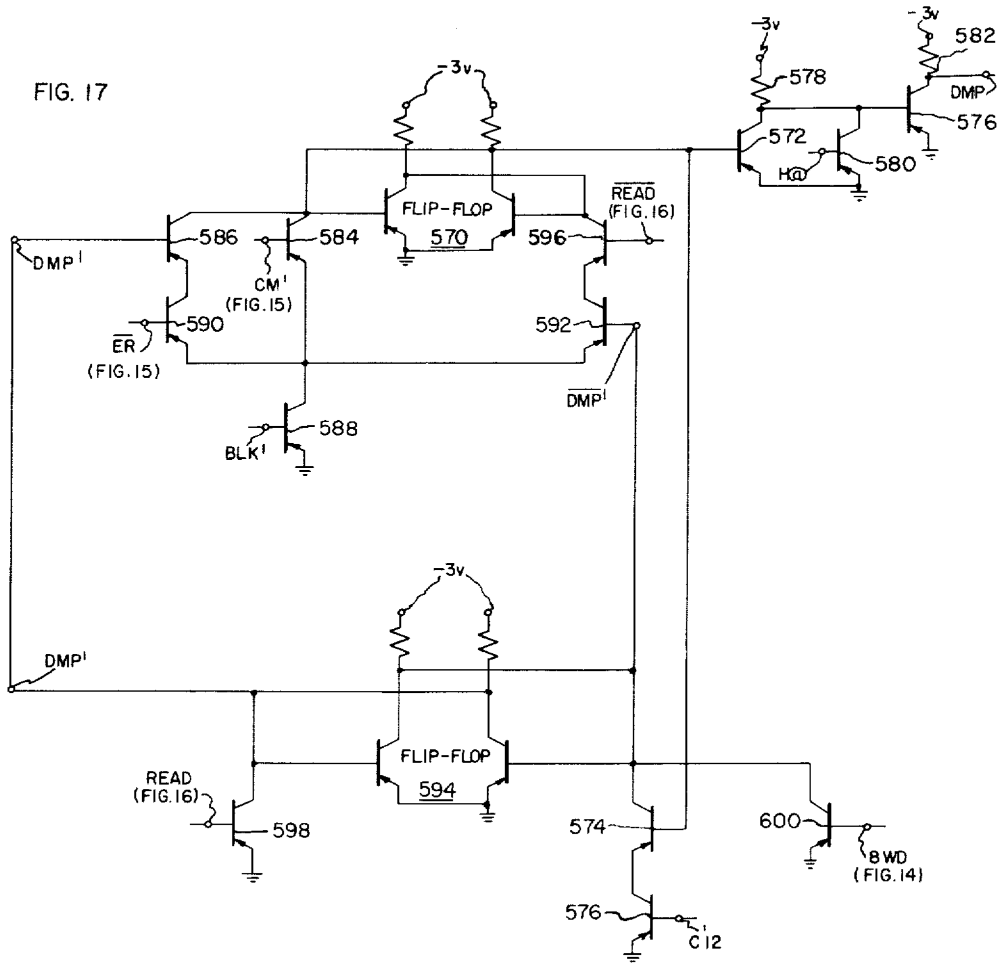
FIGURE 17 is a logic circuit for controlling the transfer of information from the half-word register into the associated 8-word register.

The term DMP, derived from the circuit of FIGURE 17 in a manner to be described, is applied to the base of a transistor 450. The collector of that transistor is connected to the common lead 444. The term 8R*g* which is derived from the circuitry of FIGURE 13 in a manner to be described, is introduced to the emitter of the transistor 450. A plurality of characters corresponding to the filler zero characters of the code table of FIGURE 2 are introduced to the base of a grounded emitter transistor 452. These characters are derived from an appropriate source for generating the same, and they are serially introduced to the base of the transistor 452 under the control of the character and bit timing signals of the computer.

The collector of the transistor 452 is connected to the emitter of a transistor 454 and to the emitter of a transistor 456. The collectors of these latter two transistors are connected to the common lead 444. The term VOID derived from the circuitry of FIGURE 7 is applied to the base of the transistor 454. The instruction term H@ is applied to the base of the transistor 456. A grounded emitter transistor 458 has its collector connected to the common lead 444. The term PWR is applied to the base of the transistor 458. This latter term is true for a pre-determined interval after the system is first turned on.

When the system is first turned on, the term PWR is true long enough to insert six null characters (111111) into the half-word delay line 400. These characters, like all other characters in the system, are made up of 7 bits, and in accordance with the table of FIGURE 2. These null characters then circulate through the read flip-flop 404 and through the transistors 414, 416, 428 and 434 back into the delay line 400. This insertion and circulation of null characters in the half-word register 12A causes the 6th character detector circuit of FIGURE 12 to set the term C6D true, in a manner to be described. This term then sets the term READ in FIGURE 6 false. Whenever the latter term is false, the tape feed mechanism in the input device 10A is controlled to stop the tape. Therefore, when the system is first turned on, the tape in the input device 10A is stopped, also, the input system cannot form the term INSERT in FIGURE 10. Therefore, when the system is first turned on, 6 null-characters circulate in the half-word register 12A, and no information can be fed into the input buffer system.

Upon the receipt of the H@ instruction from the computer, however, the transistor 456 becomes conductive, and the filler zero characters are introduced into the half-word register through the transistors 452, 456, 428 and 434. At the same time, and as will be described in conjunction with FIGURES 12 and 17, the H@ instruction causes the term DMP to become true to break the circulating loop of the half-word register as the transistor 422 becomes conductive and to complete a circuit into the 8-word register @ of FIGURE 13, as will be described. The instruction from the computer remains true for a block time, and this causes the NULL characters from the delay line 400 of the half-word register 12A to be fed into the 8-word register of FIGURE 13, followed by filler zero characters which make up the remainder of the block. At the termination of this operation, the half-word register 12A is filled with six filler zero characters, and the 8-word register of FIGURE 13 is also filled with filler zero characters. However, the six most significant characters in the 8-word register are the original NULL characters from the half-word register. These NULL characters will be used, in a manner to be described, to indicate when the 8-word register has been filled with information.

It should be pointed out, that whenever any one of the transistors 420, 422 or 424 is rendered conductive, then the transistor 416 is rendered nonconductive. The nonconductivity of the transistor 416 breaks the normal circulating loop from the read flip-flop 404 through that transistor.

Figure 12:
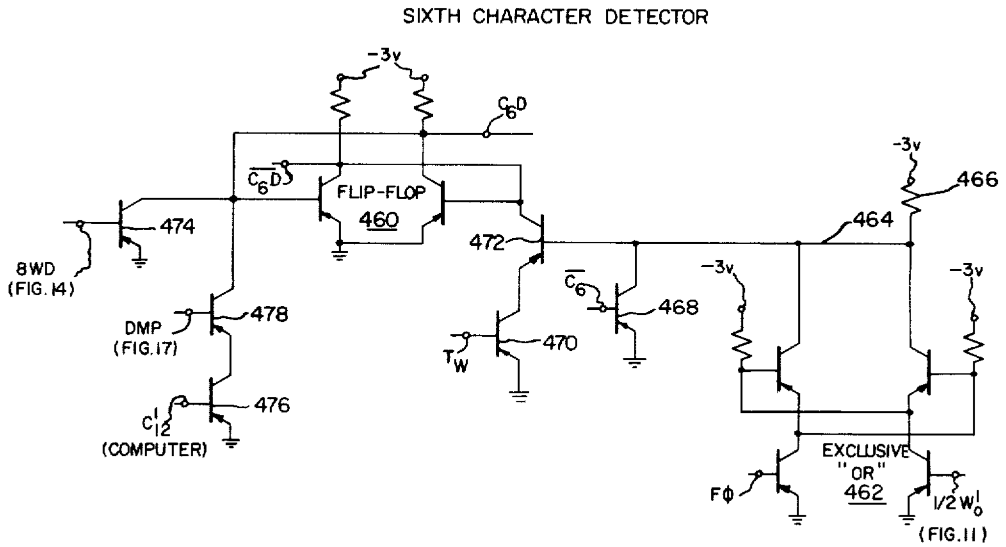
FIGURE 12 is a circuit diagram of a detector circuit which is used in the system to sense when the half-word register is filled with information.
Figure 13:
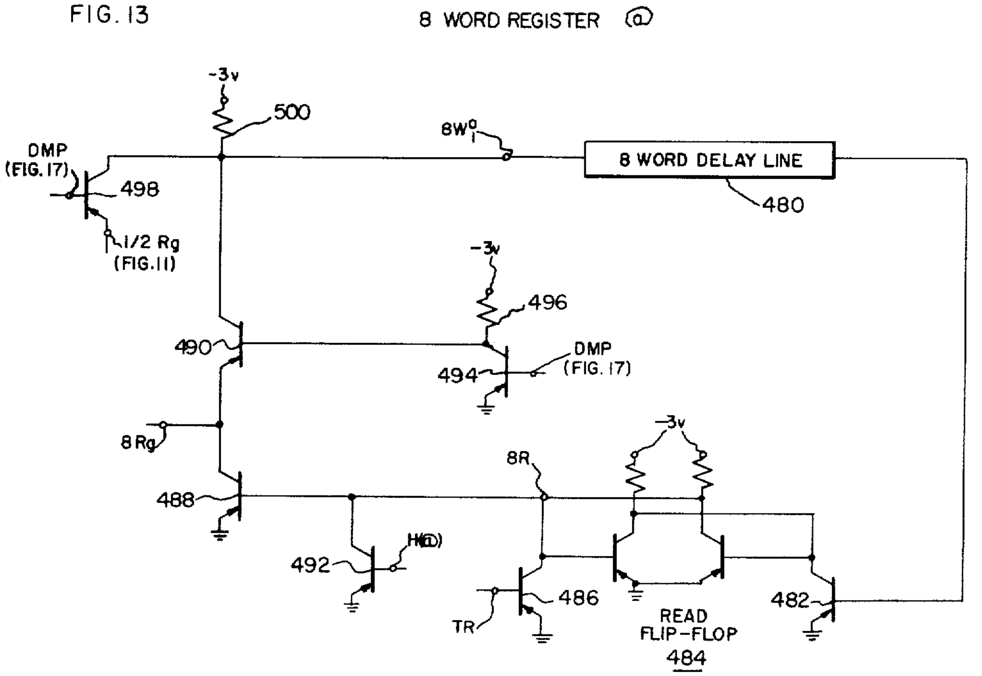
FIGURE 13 is a detailed diagram of one of the 8-word registers which are incorporated in the embodiment to be described of the input buffer of the invention.

Now that the half-word register 12A of FIGURE 11 is filled with filler zero characters, the 6th character detector circuit of FIGURE 12 causes the term $\overline{C6D}$ to be true. This permits the read flip-flop circuit of FIGURE 16 to be set true, as will be described, so that the term EX TAPE may be formed by the circuit of FIGURE 8, and so that the term INSERT may be formed by the circuit of FIGURE 10. When the term INSERT is true, the transistor 422 is conditioned for conduction. This permits the input BITS from the circuit of FIGURE 4 to be fed through the transistors 446 and 448 at the C1 character time. So long as the term INSERT is true, the normal circulating loop of the half-word register 12A is broken because the transistor 420 is rendered conductive. The contents of the half-word register now circulate through the read flip-flop 410 and through the transistor 438. The contents of the delay line 400 are re-inserted into the delay line through the transistor 440 at all character times, except the C1 character time. The term INSERT is made true for 6 character times. The term is first made true at the C1 computer character time to permit the new character to be read from the input device 10A through the transistor 446 and through the transistor 448. The term INSERT remains true for the next five character times, to permit the remaining five characters, shifted through the read flip-flop 410, to be re-inserted into the delay line 400 through the transistors 438 and 440.

The operations described above permit a new character to be inserted into the half-word register 12A from the tape of the input device 10A at C1 character time, as noted above. Moreover, the operations cause the previous contents of the half-word register 12A to be shifted by one character position. In this manner, each of the filler zero characters in the half-word register may be replaced by the successive characters read from the tape in the input device 10A. When all the filler zero characters have been so replaced, the 6th character detector circuit of FIGURE 12 causes (in a manner to be described) the term READ of FIGURE 16 to be set false. This, as mentioned above, stops the input device 10A and prevents any further information from being read into the system.

Whenever the term VOID is true, it will be remembered that this signifies that the characters previously read into the half word register 12A are to be erased. When this term is set true, the transistor 454 becomes conductive to cause the filler zeroes from the transistor 452 to be inserted into the delay line 400. At the same time, the recirculating path of the half-word register is broken because the transistor 424 now becomes conductive. The contents of the half-word register are therefore replaced by filler zeroes. At the termination of the VOID term, these filler zeroes re-circulate through the register, and it is ready to receive a subsequent set of characters from the input device 12A.

In a manner to be described when the term DMP is set true, the contents of the half-word register 12A are transferred into the corresponding 8-word circulating register @, which will be described in detail in FIGURE 13. The 8-word register is originally filled with filler zeroes, except for the NULL character which is inserted into that line from the half-word register 12A when the instruction H@ first occurs, as explained above. Each time the transfer term DMP is set true, the transistor 450 in FIGURE 11 feeds the contents of the 8-word register back into the half-word register as the contents of the half-word register are transferred into the 8-word register. At the same time, the transistor 422 becomes conductive to break the normal circulating loop of the half-word register 12A.

The action described above causes filler zeroes to be sent into the half-word register 12A from the 8-word register @ each time the six characters are fed from the half-word register into the 8-word register. This conditions the half-word register to receive the next six characters from the input device 10*a*, and this action can continue until the 8-word register is filled, as evidenced by the introduction of the six NULL characters back into the half-word register 12A. The half-word register is then prevented from receiving any further information from the input device until the 8-word register is caused to feed its information into the transfer block register by the action described in conjunction with FIGURE 3.

The details of the 6th character detector are shown in FIGURE 12, as mentioned above. This character detector includes a flip-flop 460. The term C6D is formed at the true output terminal of the flip-flop, and the term $\overline{C6D}$ is formed at the false output terminal. The 6th character detector of FIGURE 12 also includes an exclusive "or" gate 462, which, likewise, may be similar to the exclusive "or" gate described and claimed in the copending application SN 760,031, filed August 9, 1958, in the name of Frank A. Hill, referred to above.

The term $F\phi$ representing a series of filler zeroes is introduced to one of the input terminals of the exclusive "or" gate 462. The term $\frac{1}{2}W_0'$ representing the information fed into the half-word register of FIGURE 11, is introduced to the other input terminal of the exclusive "or" gate.

The output terminal of the exclusive "or" gate 462 is connected to a common lead 464. This common lead is connected to a resistor 466. The resistor may have a resistance of 10 kilo-ohms, and it is connected to the negative terminal of the 3-volt direct voltage source. The computer character timing term $\overline{C6}$ is introduced to the base of a transistor 468. The emitter of the transistor 468 is grounded, and the collector of that transistor is connected to the common lead 464.

The write clock timing pulses $T_W$ from the computer are introduced to the base of a transistor 470. The emitter of this transistor is grounded, and its collector is connected to the emitter of a transistor 472. The common lead 464 is connected to the base of the transistor 472, and the collector of that transistor is connected to the true input terminal of the flip-flop 460.

The term 8WD, which is derived from the 8-word detector circuit of FIGURE 14 in a manner to be described, is applied to the base of a transistor 474. The emitter of the transistor 474 is grounded, and the collector of that transistor is connected to the false input terminal of the flip-flop 460. The character timing signal C'12 from the computer is applied to the base of a transistor 476. The emitter of the transistor 476 is grounded, and the collector of that transistor is connected to the emitter of a transistor 478. The term DMP, which is derived from the circuit of FIGURE 17 in a manner to be described, is applied to the base of the transistor 478. The collector of the transistor 478 is also connected to the false input terminal of the flip-flop 460.

As noted above, the exclusive "or" gate 462 may be of the type described and claimed in co-pending application S.N. 760,031, filed August 9, 1958, in the name of Frank A. Hill. This exclusive "or" gate compares the information read into the half-word delay line 400 of FIGURE 11 ($\frac{1}{2}W_0'$) with the filler zero characters ($F\phi$) from the filler zero source. Whenever a character introduced to the half-word delay line 400 in FIGURE 11 is different from a filler zero, the output of the exclusive "or" gate 462 is set high. Then, should that occur during the 6th computer character time, the flip-flop 460 is triggered true by the next $T_W$ clock pulse to make the term C6D true.

As will be described in conjunction with FIGURE 16, so long as the term C6D is true, the term $\overline{\text{READ}}$ is true so that the input device 10A is stopped and the circuitry is blocked so that no information can be read from the tape into the half word register 12A. The flip-flop 460 in FIGURE 12 is set false just before the 12th character time after the transfer term DMP has transferred the contents of the half-word register 12A into the 8-word register @. Then, if the next character to pass through the exclusive "or" gate 462 is a filler zero, the flip-flop 460 remains false to permit a subsequent six characters to be read into the half-word register 12A from the input device 10A. However, if the character passing through the exclusive "or" gate 462 is something other than a filler zero, to indicate a filled or a null condition in the half-word register, the flip-flop 460 is set true and no further information can be read into the half-word register until that condition has been overcome.

The control described in the preceding paragraph as will become more evident as the description proceeds, serves to prevent information from being read into the half-word register 12A during an initial condition before the receipt of the H@ instruction, during a condition in which the half-word register is filled, or during a condition in which the 8-word register @ is filled.

When the 8-word register @ reaches its filled condition, the term 8WD goes true and the null characters, originally fed into that register from the half-word register, are returned to the half-word register. As the first one of these null characters passes through the exclusive "or" gate 462 of FIGURE 12, it would normally return the flip-flop 460 to its true state to make the term C6D true. However, the flip-flop is held false by the term 8WD, as that term renders the transistor 474 conductive. This permits the input device 10A to continue to operate until a CR character on the tape is read. However, the INSERT term in FIGURE 10 is false in the presence of the 8WD term. Therefore, even though the tape in the input device 10A continues to move past the reading station in that device, the information from the tape is not read into the input buffer system. This permits the programmer to enter notes on the tape for his own information after the end of each block of information, and no extra provisions need be made to prevent that information from being read into the input buffer system.

Therefore, when the system is first turned on, the half-word register 12A is filled with null characters and the 8-word register @ is filled with filler zeroes. Then, upon the occurrence of the H@ instruction, the six null characters from the half-word register 12A are transferred to the 8-word register @, and six filler zero characters from the 8-word register are transferred to the half-word register. The input device 10A now proceeds to feed six characters into the half-word register successively replacing the filler zero characters in that register with the input characters. Each time the half-word register is filled with six characters, it transfers the six characters in a serial bit-by-bit manner to the eight-word register, as will be described.

The operations described above continue until the 8-word register is filled with a block of information from the input device 10A. When that occurs, the 8-word register returns the null characters originally received from the half-word register to the half-word register. For this condition, therefore, the 8-word register introduces null characters to the half-word register instead of introducing filler zero characters into the half-word register. The presence of the null characters in the half-word register, in a manner to be described, prevents any further transfers from taking place, until the next H@ instruction is received. However, the tape in the input device 10A continues to move past the reading station in that device until a CR symbol on the tape is read, for the reasons described above.

The 8-word register @ is shown in FIGURE 13. This register includes an 8-word delay line 480. The output of the delay line 480 is introduced to the base of a transistor 482. The emitter of that transistor is grounded, and the collector of the transistor is connected to the true input terminal of a read flip-flop 484. The read clock pulses $T_R$ from the computer are introduced to the base of a transistor 486. The emitter of the transistor 486 is grounded, and the collector of that transistor is connected to the false input terminal of the read flip-flop 484.

The read flip-flop 484 develops the term 8R at its true output terminal, and that term is introduced to the base of a transistor 488. The emitter of the transistor 488 is grounded, and the collector of that transistor is connected to the emitter of a transistor 490. The transistor 488 also develops the term 8R*g* at its collector. The instruction H@ from the computer is introduced to the base of a transistor 492. The emitter of the transistor 492 is grounded, and the collector of that transistor is connected to the base of the transistor 488.

The term DMP derived from the circuit of FIGURE 17 is applied to the base of a transistor 494. The emitter of the transistor 494 is grounded, and the collector of that transistor is connected to the base of a transistor 490 and to a resistor 496. The resistor 496 may have a resistance of 3.9 kilo ohms, and it is connected to the negative terminal of the 3-volt direct voltage source. The term DMP of FIGURE 17 is also applied to the base of a transistor 498, and the term $\frac{1}{2}Rg$ of FIGURE 11 is applied to the emitter of that transistor. The collectors of the transistors 490 and 498 introduce the term $8W_1^0$ to the 8-word delay line 480, and these collectors are also connected to a resistor 500. The resistor 500 may have a resistance of 3.9 kilo ohms, and it is connected to the negative terminal of the 3-volt direct voltage source.

The 8-word detector of FIGURE 14 includes a flip-flop 502. This flip-flop develops the term 8WD at its true output terminal, and it develops the term $\overline{\text{8WD}}$ at its false output terminal. The computer character timing signal $C_{12}'$ is introduced to the base of a transistor 504. The emitter of that transistor is grounded, and its collector is connected to the emitter of a transistor 506. The term DMP of FIGURE 17 is applied to the base of the transistor 506, and the collector of that transistor is connected to the true input terminal of the flip-flop 502. The write clock pulses $T_W$ from the computer are introduced to the base of a transistor 508. The emitter of that transistor is grounded, and its collector is connected to the emitter of a transistor 510. The term $\frac{1}{2}W_1^0$ of FIGURE 11 is applied to the base of the transistor 510, and the collector of that transistor is connected to the false input terminal of the flip-flop 502.

The collector of a transistor 512 is also connected to the false input terminal of that flip-flop. The emitter of the transistor 512 is grounded, and the term PWR is applied to its base.

After each transfer operation between the half-word register and the 8-word register, and just before the C12 computer character time, the term $C_{12}'$ from the computer triggers the flip-flop 502 true. However, if the next character introduced to the delay line 400 of the half-word register in FIGURE 11 is anything but a null character, the flip-flop 502 is returned to its false state. Therefore, when the first null character of the six originally inserted into the 8-word registers from the half-word register is returned to the half-word register, indicating that the 8-word register is filled, the flip-flop 502 remains true, and the term 8WD remains true. This, as described above, prevents the term INSERT of FIGURE 10 from being set true, so that no further information can be input from the input device 10A to the half-word register 12A. As also described, this term causes the 6th character detector of FIGURE 12 to hold the term C6D false, so that the input device 10A is not stopped but continues to operate until the next CR character is read.

As mentioned previously, the buffer system can be conditioned to an "input mode" (IM) in which it is capable of receiving information from the input device 10A or to a computer mode (CM) in which it is capable of introducing information to the computer transfer block register 14 of FIGURE 3. The system is controlled to be in one of these modes or the other by the circuitry of FIGURE 15.

Figure 15:
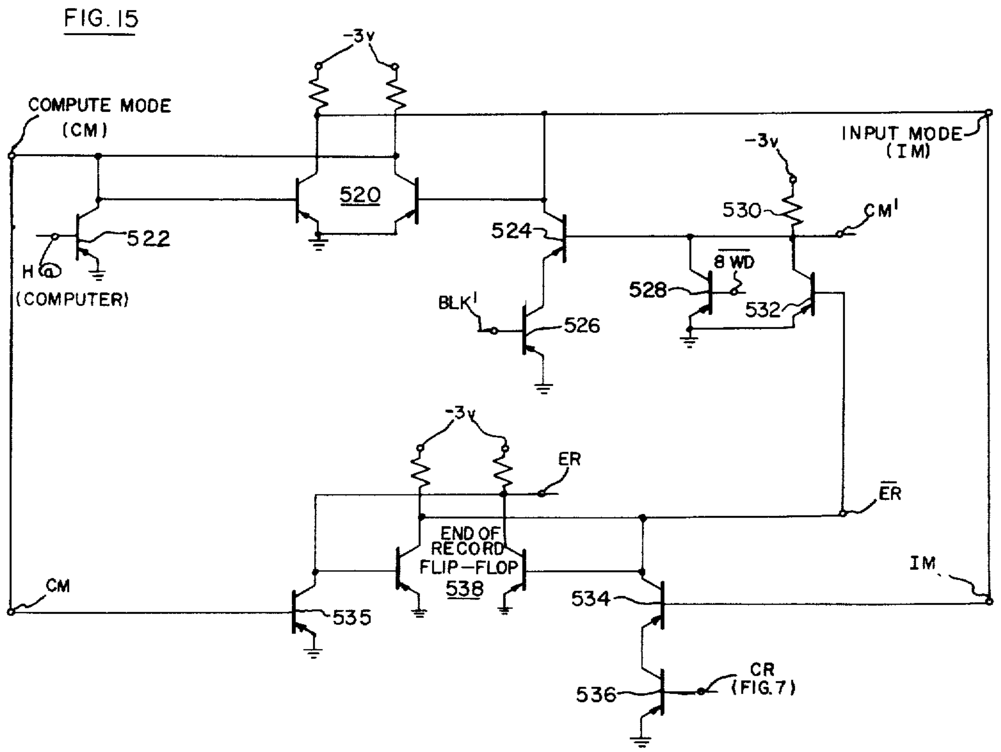
FIGURE 15 is a circuit diagram of a logic system for conditioning the input buffer of the invention to an input mode for receiving information from the input device, or to a compute mode in condition to introduce information to the associated computer or data processor.

The circuitry of FIGURE 15 includes a flip-flop 520. The instruction H@ from the computer is introduced to the base of a transistor 522. The emitter of the transistor 522 is grounded and the collector of that transistor is connected to the false input terminal of the flip-flop 520. A transistor 524 has its collector connected to the true input terminal of the flip-flop 520. A transistor 526 has its collector connected to the emitter of the transistor 524, the term $BLK^1$ is introduced to the base of the transistor 526, and the emitter of that transistor is grounded.

The term $\overline{8WD}$ is applied to the base of a transistor 528. The emitter of that transistor is grounded, and its collector is connected to the base of the transistor 524 and to a resistor 530. The resistor 530 has a resistance of 6.8 kilo ohms, and it is connected to the negative terminal of the 3-volt direct voltage source. The term $\overline{ER}$ is applied to the base of a transistor 532. The emitter of the transistor 532 is grounded, and the collector of that transistor is connected to the resistor 530 and to an output terminal designated $CM^1$.

The flip-flop 520 developes the input mode term (IM) at its false output terminal, and that term is introduced to the base of a transistor 534. The flip-flop 520 developes the computer mode term (CM) at its true output terminal, and that term is introduced to the base of a transistor 535. The term CR of FIGURE 7 is applied to the base of a transistor 536. The emitter of the transistor 536 is grounded, and its collector is connected to the emitter of the transistor 534. The collector of the transistor 534 is connected to the true input terminal of an "end-of-record" flip-flop 538.

The emitter of the transistor 535 is grounded, and its collector is connected to the false input terminal of the flip-flop 538. The flip-flop 538 developes the term $\overline{ER}$ at its false output terminal and that term is introduced to the base of the transistor 532. The flip-flop 538 developes the term ER at its true output terminal.

The flip-flop 520 can be set to make the term IM true by the instruction H @ from the computer. After the input operation has been completed the term CR (formed in the circuit of FIGURE 7 in response to a CR character from the tape of the input device 10A) triggers the end-of-record flip-flop 538 true. It will be remembered that the character CR on the tape signifies the end of the record to be read into the computer at that time, regardless of whether or not a complete 8-word block has been read into the input buffer.

When the end-of-record flip-flop 538 is triggered true, the term $\overline{ER}$ is set false. Then, when the null characters are returned to the half-word register 12A, the 8-word detector of FIGURE 14 sets the term $\overline{8WD}$ false to permit the flip-flop 520 of FIGURE 15 to be set true just before the next block time by the term $BLK^1$. This causes the term CM to be set true and the buffer system to be changed from the input mode to the computer mode of the operation. The term CM returns the end of record flip-flop 538 to its false state in readiness for the next CR character from the input tape reader 10A, as produced by the circuitry of FIGURE 7.

Figure 16:
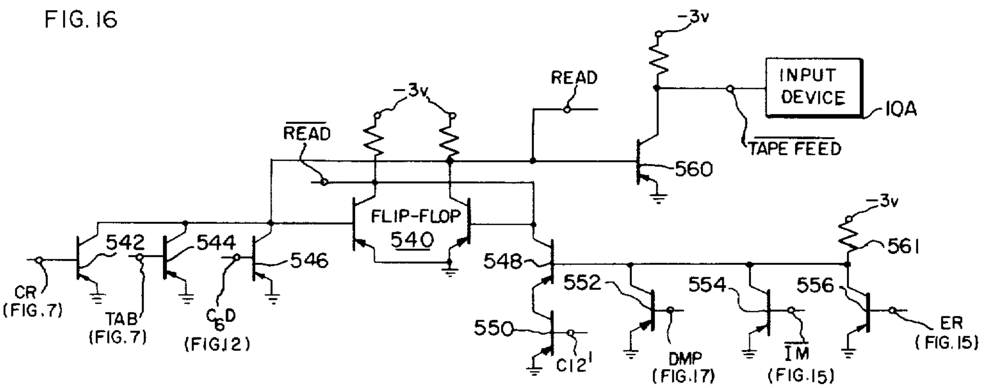
FIGURE 16 is a flip-flop circuit for controlling the reading of the input device.

The term "READ" is formed by the circuitry of FIGURE 16. It will be remembered that this term is used in the circuitry of FIGURE 8, and that the term EXTAPE can be set true until the term READ is true. This means that the term INSERT cannot be set true by the circuitry of FIGURE 10 until the term READ is true, so that information cannot be read through the transistor 442 in FIGURE 11 until the term READ is true.

The term READ is controlled by the circuitry of FIGURE 16. This circuit includes a flip-flop 540. A plurality of transistors 542, 544, 546 have their collectors connected to the false input transistor of the flip-flop 540. The emitters of these transistors are all grounded. The term CR of FIGURE 7 is applied to the base of the transistor 542, the term TAB of FIGURE 7 is applied to the base of the transistor 544, the term C6D of FIGURE 12 is applied to the base of the transistor 546.

A transistor 548 has its collector connected to the true input terminal of the flip-flop 540. The character timing signal $C_{12}^1$ from the computer is applied to the base of a transistor 550. The emitter of the transistor 550 is grounded, and the collector of that transistor is connected to the emitter of the transistor 548.

The term DMP of FIGURE 17 is introduced to the base of a transistor 552, and the term $\overline{IM}$ of FIGURE 15 is applied to the base of a transistor 554. Likewise, the term ER of FIGURE 15 is applied to the base of a transistor 556. The emitters of the transistors 552, 554 and 556 are grounded, and the collectors of these transistors are all connected to the base of a transistor 548 and to a resistor 561. The resistor 561 may have a resistance of 4.7 kilo-ohms, for example, and it is connected to the negative terminal of the 3-volt direct voltage source.

The flip-flop 540 developes the term READ at its true output terminal, and that term is introduced to the base of a transistor 560. The emitter of the transistor 560 is grounded, and the collector of that transistor is connected to the input device 10A to control the tape feed in that device. Whenever the term READ is true the tape feed mechanism in the input device 10A is energized to move the tape past the reading station in that device.

The term READ is set false to prevent further reading of information from the input device, and this is accomplished in several ways. For example, whenever the term CR is read from the tape the circuitry of FIGURE 7 causes that term to be introduced to the base of the transistor 542 to set the flip-flop 540 false. Also, the character TAB from the tape causes the circuitry of FIGURE 7 to introduce the term TAB to the transistor 544 to set the flip-flop 540 false. Also, whenever the sixth character detector of FIGURE 12 is set true, in response to the half-word register 12A reaching a filled condition, the transistor 546 is rendered conductive to set the flip-flop 540 false. It is evident that whenever the flip-flop 540 is false the term READ is set false, and the movement of the punched paper tape in the input device 10A is arrested.

The term READ is true during the input mode (IM)

of the buffer system, and when the term $\overline{IM}$ of FIGURE 15 is false. For the term READ to be true, however, the end-of-record flip-flop 538 of FIGURE 15 must be false to set the term ER false. Also, the transfer term DMP of FIGURE 17 must be false. Only for all these conditions are the transistors 552, 554 and 556 in FIGURE 16 non-conductive, then the timing signal $C_{12}^1$ is able to set the flip-flop 540 true just before the 12th character time because the transistor 548 is now conditioned for conduction.

The transfer term DMP is formed by the circuitry of FIGURE 17. That circuitry includes a flip-flop 570. The flip-flop 570 developes the term DMP at its true output terminal, and that term is introduced to the base of a transistor 572 and to the base of a transistor 574. The emitter of the transistor 572 is grounded, and the collector of the transistor is connected to the base of a transistor 576 and to a resistor 578. The resistor 578 may have a resistance of 3.9 kilo-ohms and it is connected to the negative terminal of the 3-volt direct voltage source.

The instruction H @ from the computer is introduced to the base of a transistor 580. The emitter of the latter transistor is grounded, and the collector of that transistor is connected to the base of the transistor 576. The emitter of the transistor 576 is grounded, and its collector is connected to a resistor 582. The resistor 582 may have a resistance of 2.2 kilo-ohms, and it is connected to the negative terminal of the 3-volt direct voltage source. The transistor 576 developes the term DMP whenever the flip-flop 570 is true, or whenever the instruction H @ from the computer is received. When the instruction H @ is received, the term DMP transfers the null characters from the half-word register 12A to the 8-word register @, as explained above.

The false input terminal of the flip-flop 570 is connected to the collector of a transistor 584 and to the collector of a transistor 586. The term $CM^1$ of FIGURE 15 is applied to the base of the transistor 584 and the term $DMP^1$ is applied to the base of the transistor 586. The term $BLK^1$ from the computer is introduced to the base of a transistor 588. The collector of the transistor 588 is connected to the emitter of the transistor 584 and to the emitter of a pair of transistors 590 and 592. The emitter of the transistor 588 is grounded. The term $\overline{ER}$ of FIGURE 15 is applied to the base of the transistor 590, and the term $\overline{DMP}^1$ is applied to the base of the transistor 592.

The terms $DMP^1$ and $\overline{DMP}^1$ are formed by a flip-flop 594. The collector of the transistor 592 is connected to the emitter of a transistor 596. The term $\overline{READ}$ of FIGURE 16 is applied to the base of the transistor 596, and the collector of that transistor is connected to the true input terminal of the flip-flop 570. The term READ of FIGURE 16 is applied to the base of a transistor 598. The emitter of that transistor is grounded, and its collector is connected to the false input terminal of the flip-flop 594.

The collector of the transistor 574 is connected to the true input terminal of the flip-flop 594, and the emitter of that transistor is connected to the collector of a transistor 576. The term $C_{12}^1$ is applied to the base 576, and the emitter of that transistor is grounded. The term 8WD of FIGURE 14 is applied to the base of a transistor 600, and the collector of the transistor 600 is also connected to the true input terminal of the flip-flop 594. The emitter of the transistor 600 is grounded.

During the time that the READ term is true, the flip-flop 594 in FIGURE 17 is set false to set the term $\overline{DMP}^1$ true. Then, the next time the term READ is set false, the flip-flop 570 in FIGURE 17 is set true. This causes the term DMP to be true so that the contents of the half-word register 12A can be shifted into the 8-word register as described above. The term DMP is also set true in response to the H@ instruction from the computer, as noted so as to set the original null characters and filler zero characters into the 8-word register as described above. When the term DMP is set true, the flip-flop 594 is returned to its true state at the following $C_{12}^1$ time to cause the term $\overline{DMP}^1$ to be set true. This also occurs when the 8-word detector of FIGURE 14 indicates that the 8-word register @ is full.

When the term $DMP^1$ becomes true, and assuming that the term ER is false, then when the term $BLK^1$ becomes true at the end of the block time, the flip-flop 570 is set false to set the transfer term DMP false. Whenever the end-of-record term ER becomes true the term $CM^1$ of FIGURE 15 becomes true and the flip-flop 570 in FIGURE 17 is set false at the end of the block time to set the term DMP false.

Therefore, the transfer of information from the half-word register 12A to the 8-word register @ is controlled by the DMP term. Also, this term is controlled by the term $BLK^1$ in FIGURE 17 so that it is true from the beginning to the end of a block time. The transfer extends through a circulating path from the half-word register 12A in FIGURE 11, through the transistor 498 in FIGURE 13 into the 8-word register, through the transistor 450 in FIGURE 11, back into the half-word register 12A. This means that the six characters in the half-word register 12A are introduced into the 8-word register, and that these characters are successively shifted toward the most significant end of the 8-word register as the register is loaded.

The invention provides, therefore, a simple and improved input buffer system. The input buffer system of the invention permits information from an input device to be loaded into a circulating register in an associated computer in readiness for subsequent use by the computer. The input buffer system of the invention may be controlled in the manner described above by the use of functional characters on the tape, and by other appropriate controls, so that full flexibility is achieved and full control over the input information is realized.

We claim:

1. An input buffer system for use in conjunction with an electronic digital computer, and the like, including: first circulating register means for storing binary signals representiative of a pre-determined number of multi-bit characters, second circulating register means for storing binary signals representative of a number of multi-bit characters greater than said pre-determined number, an input reading system for successively reading a plurality of multi-bit characters stored in an input device, first control circuitry coupled to said reading system and to said first circulating register and responding to timing signals from the computer for causing said input reading system to serially introduce each of the characters read thereby to said first circulating register for circulation therein with a pre-determined timing, second control circuitry coupled to said first circulating register means and to said second circulating register means and responsive to timing signals from the computer for causing the contents of said first register means to circulate into said second register means and the contents of said second register means to circulate into said first register means, and circuit means responsive to a first signal for de-activating said second control circuitry and for activating said first control circuitry and responsive to a second signal for activating said second control circuitry and for de-activating said first control circuitry.

2. The combination defined in claim 1 and in which said last mentioned circuit means including circuitry coupled to said reading system and responsive to signals representing a pre-determined one of the characters stored in said input device for causing said circuit means to de-activate said first control circuitry and to activate said second control circuitry.

3. The combination defined in claim 1 and in which said last mentioned circuit means includes a detector circuit coupled to said first register means and responsive to signals representing any of said characters other than a pre-determined one of said characters for causing said circuit means to deactivate said first control circuit and to activate said second control circuitry.

4. An input buffer system for use in conjunction with an electronic digital computer, and the like, including a first circulating register means for storing binary signals representative of a pre-determined number of multi-bit characters, second circulating register means for storing binary signals representative of a number of multi-bit characters greater than said pre-determined number, an input reading system for successively reading a plurality of multi-bit characters stored in an input device, first transfer circuitry coupled to said input reading system and to said first circulating register for causing the input reading system to serially introduce each of the characters read thereby to said first circulating register, second transfer circuitry coupled to said first circulating register means and to said second circulating register means for causing the contents of said first register means to circulate into said second register means and the contents of said second register means to circulate into said first register means, first control circuit means for initially inserting signals representative of a first pre-determined one of said characters into said first register means, second control circuit means for activating said second transfer circuitry upon the receipt of a pre-determined command signal from the computer and for inserting signals representative of a second pre-determined one of said characters into said first and second circulating register means, first detector means coupled to said first circulating register means and responsive to signals representative of said second pre-determined character for activating said first transfer circuitry, said first detector circuit means being responsive to signals representing characters other than said second pre-determined character to de-activate said first transfer circuitry and to activate said second transfer circuitry.

5. The input buffer system defined in claim 4 and which includes second detector circuit means coupled to said first circulating register means and responsive to the recirculation of signals representative of said first pre-determined character to said first circulating register means from said second circulating register means to de-activate said first transfer circuitry and to de-activate said second transfer circuitry.

6. The input buffer system of claim 5 and which includes a further control system for terminating movement of the input device upon the de-activation of said first transfer circuitry, and which includes further circuit means coupled to said second detector circuit means to render said further control system ineffective for terminating such movements of the input device upon the de-activation of said first transfer circuitry and of said second transfer circuitry by said second detector circuit means.

References Cited in the file of this patent

UNITED STATES PATENTS 2,969,622 Crosby ---------------- Jan. 24, 1961